June 5, 1956 — N. F. CORNELIUS — 2,748,606
MECHANICAL MOVEMENT
Filed Nov. 30, 1951 — 2 Sheets-Sheet 1

Inventor
NELSON F. CORNELIUS
By Caswell & Lagaard
ATTORNEYS

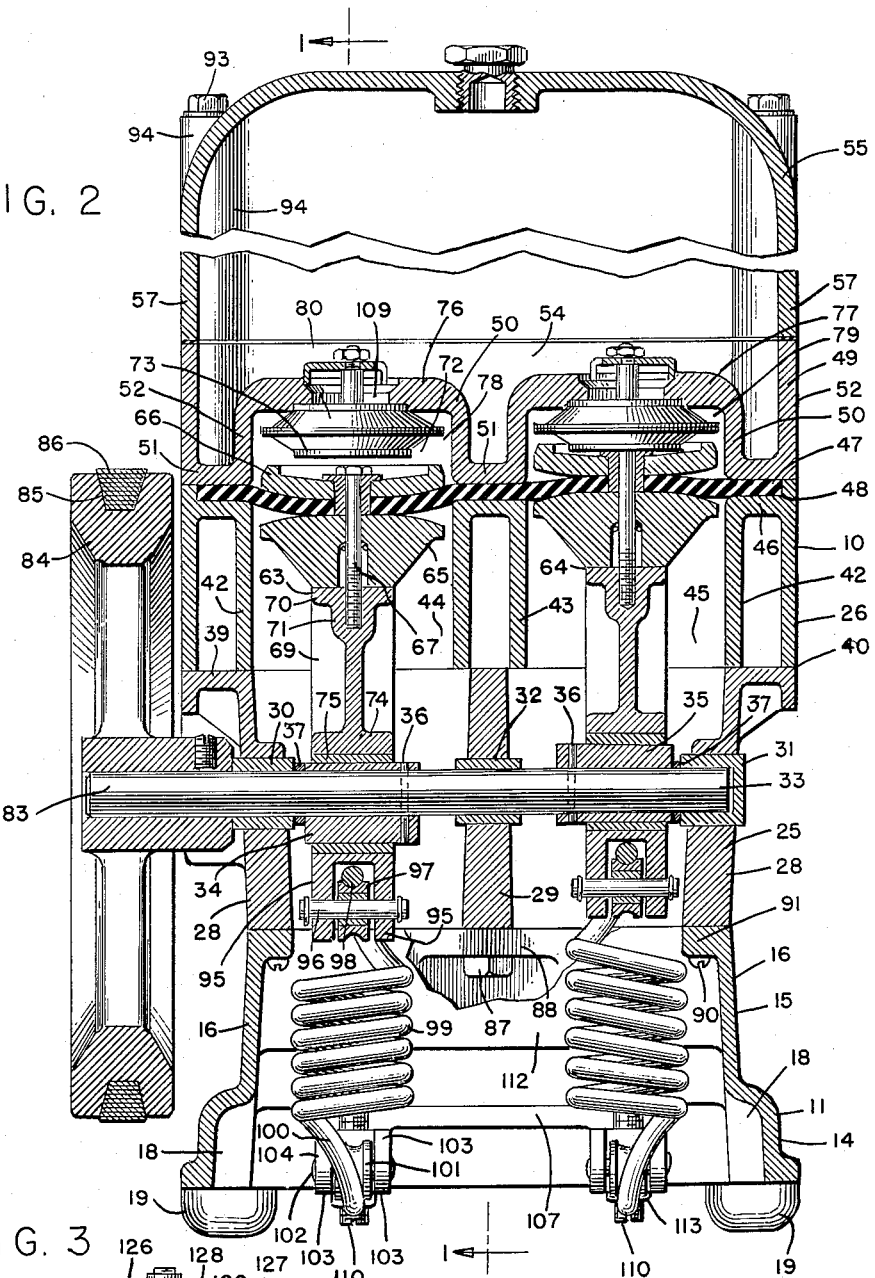

United States Patent Office 2,748,606
Patented June 5, 1956

2,748,606

MECHANICAL MOVEMENT

Nelson F. Cornelius, Anoka, Minn., assignor to The Cornelius Company, Minneapolis, Minn., a corporation of Minnesota Application November 30, 1951, Serial No. 259,217

6 Claims. (Cl. 74—49)

The herein disclosed invention relates to diaphragm pumps and has for an object to produce a pump having high efficiency at low cost.

Another object of the invention resides in providing a diaphragm pump which will be compact in form.

A still further object of the invention resides in providing a diaphragm pump in which sleeve type bearings or other inexpensive roller bearings may be used between the connecting rod and crank member.

Another object of the invention resides in providing resilient means for maintaining the portion of the connecting rod bearing adjacent the piston always in contact with the crank member.

A still further object of the invention resides in disposing the resilient means between the connecting rod and base for the pump for maintaining such portion of the bearing in contact with the crank member.

An object of the invention resides in utilizing a tension coil spring for the purpose and in connecting one end of said coil spring to the base and the other to the connecting rod at a point on the side of said bearing opposite the piston.

A still further object of the invention resides in connecting the end of the said coil spring attached to the base at a locality to one side of a plane containing the axis of the crank shaft and perpendicular to the plane of the diaphragm.

Another object of the invention resides in providing means for adjusting the tension on said spring.

Other objects of the invention reside in the novel combination and arrangement of parts and in the details of construction hereinafter illustrated and/or described.

In the drawings:

Fig. 2 is an elevational sectional view taken on line 2—2 of Fig. 1.

Fig. 3 is a cross sectional view taken on line 3—3 of Fig. 1 and drawn to a greater scale.

Figure 1:
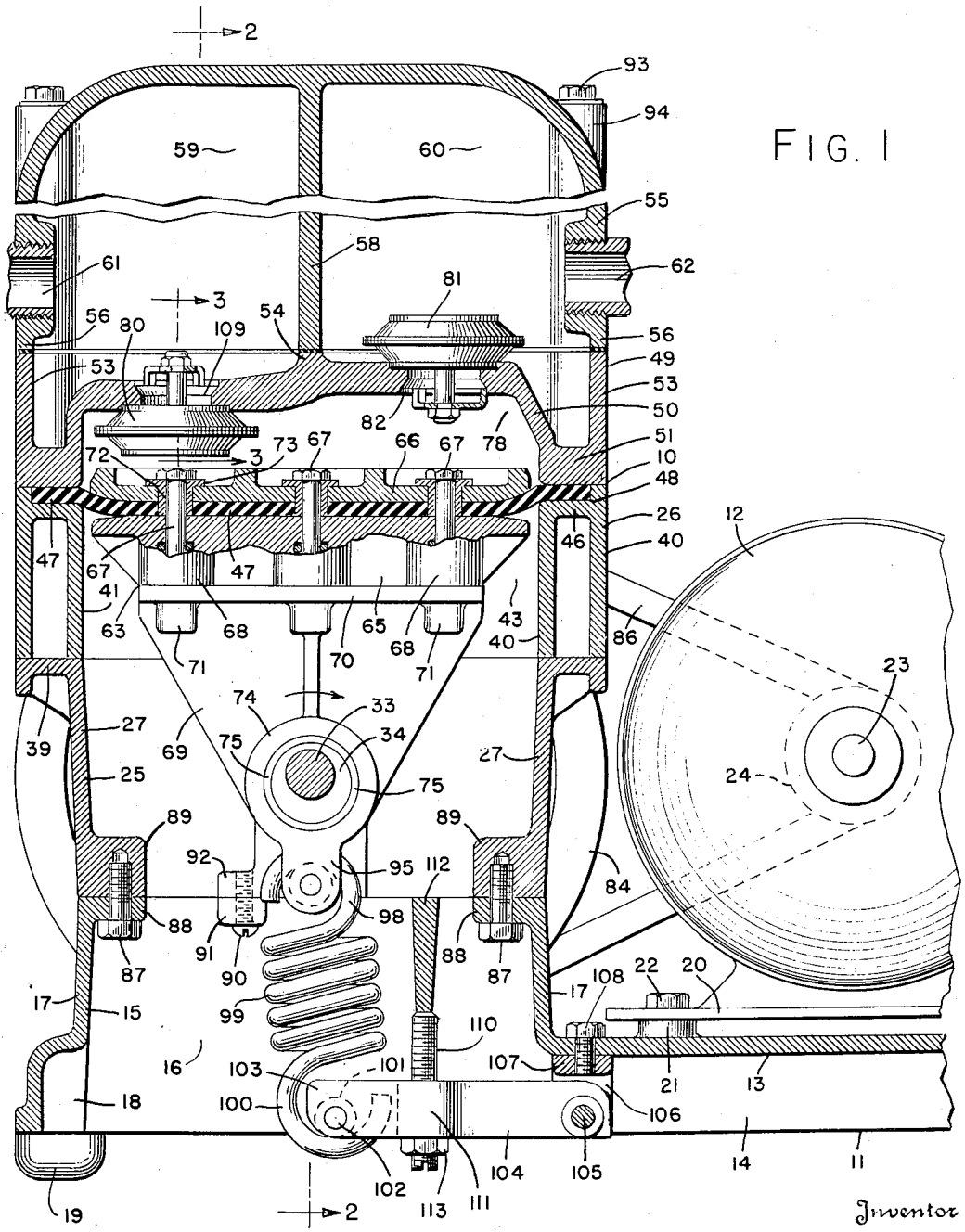
Fig. 1 is an elevational sectional view of a diaphragm pump illustrating an embodiment of the invention and taken on line 1—1 of Fig. 2.

In the drawings has been shown a pump of the diaphragm type having a body mounted on a base and supporting for rotation a crank shaft. Overlying the body is a head and between the head and body is a diaphragm connected to a piston. The crank shaft has a crank member and a connecting rod secured to the piston is provided with a bearing rotatably receiving said crank member. The connecting rod has a portion extending beyond said bearing and to which is pivoted one end of a tension coil spring. The other end of said tension coil spring is adjustably connected to the base and at a locality to one side of the plane passing through the axis of the crank shaft and perpendicular to the plane of the diaphragm.

This invention is an improvement over the diaphragm pump disclosed in the application for patent of Richard T. Cornelius, Serial Number 130,727, filed December 2, 1949, now Patent 2,650,545, September 1, 1953, for diaphragm pumps. In the said application a ball bearing was employed between the connecting rod and the crank member of the crank shaft. Such construction is extremely expensive and at the same time requires precision machining. Where sleeve bearings or inexpensive needle roller bearings have been employed for the purpose, the slightest amount of wear causes knocking and slapping of the bearing against the crank member thereby making the pump extremely noisy and increasing the wear on the parts. The instant invention overcomes this objection by maintaining the side of the bearing adjacent the piston always in contact with the crank member and in further causing the piston to be urged to rotate in a direction opposite to the direction of rotation caused by the operation of the pump.

The invention shown in the drawings consists of a diaphragm pump 10 which is mounted on a base 11. A motor 12 also mounted on said base serves to drive the pump. It will, however, be comprehended that the pump may be otherwise mounted and may be driven by any suitable source of motive power.

The base 11 is preferably in the form of a casting having a platform 13 with a flange 14 depending therefrom. Issuing upwardly from the base 11 is a base portion 15 having side walls 16 and end walls 17. At the corners of the base 11 are provided fillets 18 and to which are attached feet 19 which serve to support the entire motor pump unit on the surface on which the same is disposed.

The motor 12 may be of any suitable construction and has a base 20 which rests upon bosses 21 formed on the platform 13. Cap screws 22 extend through said base and are screwed into the bosses 21 and serve to attach the motor to the base 11. The motor 12 has a motor shaft 23 which carries a pulley 24 and by means of which the pump 10 is driven.

The pump 10 consists of a body 40 having a lower body section 25 and an upper body section 26. The body section 25 is formed with end walls 27 and side walls 28. In addition a partition 29 extends across the two walls 27 midway between the same. This partition is of the same height as the walls 27 and 28. Mounted in the walls 28 and in the partition 29 are crank shaft bearings 30, 31 and 32 which support for rotation a crank shaft 33. Between the said bearings are provided two eccentrics 34 and 35 which form the crank members on the crank shaft 33. These eccentrics are disposed 180° in angular relation to one another and are attached to the crank shaft by means of pins 36 which extend through said eccentrics and crank shaft. To prevent end play of the shaft 33 two thrust washers 37 of nylon or similar material are employed which are disposed between and engage the bearings 30 and 31 and the eccentrics 34 and 35.

The upper body section 26 is similarly constructed to the body section 25 and has end walls 41 and side walls 42 which overlie the walls 27 and 28. The walls 27 and 28 have flanges 39 extending outwardly therefrom and on which the walls 41 and 42 rest. The body section 26 is also formed with a partition 43 which overlies the partition 29 and which together with the partition 29 divide the body 40 into two compartments 44 and 45. Overlying the upper ends 46 of the walls 41 and 42 and partition 43 is a diaphragm 47 which is received in a rabbet 48 in said upper body section. A head 49 overlying the body 40 has a transverse wall structure 50 which is formed with a lower planiform portion 51 resting on the diaphragm 47. The head 49 has side walls 52 and end walls 53 and is further formed with a partition 54 extending transversely of the partitions 43 and 29 and located midway between the walls 53. Overlying the head 49 is a cap 55 which has end walls 56 and side walls 57 which overlie and rest upon the upper ends of the walls 52 and 53 of the head 49. The said cap further has a partition 58 which overlies and registers with the partition 54. By means of said partitions and walls two chambers 59 and 60 are formed above the wall structure 50. The chamber 59 serves as an inlet chamber and the chamber 60 as an outlet chamber. Suitable inlet and outlet fittings 61 and 62 are connected to the walls 56 and serve to bring the said chambers into communication with the fluid being pumped.

The body 40 is attached to the base portion 15 by means of a number of cap screws 87. These cap screws extend through lugs 88 which are formed at the upper ends of the walls 17 of said base portion and are screwed into bosses 89 formed on the lower ends of the walls 27 of the lower body section 25. In addition other screws 90 extend through lugs 91 formed on the walls 17 and are threaded into bosses 92 formed on the walls 28 of the body section 25. The cap 55, the head 49 and the body sections 25 and 26 are all secured together by means of long cap screws 93 which extend through bosses 94 formed in the cap 55, the head 49 and the upper body section 26. These cap screws are screwed into the flange 39 formed on the upper end of the body section 25.

In the chambers 44 and 45 and respectively operated by the eccentrics 34 and 35 are two piston units 63 and 64. Since both of these units are identical in construction only the unit 63 will be described in detail. This piston unit consists of a piston 65 which underlies the portion of the diaphragm 47 disposed above compartment 44. This piston is elongated in form extending substantially throughout the space formed by said compartment as shown in Fig. 1. Overlying the diaphragm 47 and immediately above said piston is a follower 66 of the same shape and extent as said piston. A number of cap screws 67 extend through the follower 66 and through bosses 68 formed on the piston 65. Below the piston 65 is a connecting rod 69 which has a flange 70 underlying the bosses 68. The cap screws 67 are screwed into this flange and into bosses 71 formed in the connecting rod as shown in Fig. 2 and serve to clamp the parts together. To prevent undue pressure on diaphragm 47 sleeves 72 extend through the follower 66 and diapragm 47 and encircle the cap screws 67. These sleeves engage the piston 65 and have flanges 73 formed thereon which engage the follower 66 and the heads of the cap screws 67. By means of this construction the pressure on the diaphragm is controlled and all of the parts are rigidly secured together.

The connecting rod 69 has a boss 74 formed on the lower portion of the same and which is bored to receive a bushing 75. The eccentric 34 on crank shaft 33 passes through said bushing which serves as a crank shaft bearing for connecting the piston to the crank shaft. It will readily be comprehended that when the crank shaft 33 is rotated piston 65 in compartment 44 is reciprocated back and forth. The parts are lubricated in any suitable manner.

The wall structure 50 of the head 49 has two raised portions 76 and 77 which form in said head with the diaphragm 48 two valve chamber 78 and 79. In the said wall structure is provided an inlet valve 80. The said wall structure has a port 109 in the same which communicates with the valve chamber 78 and the chamber 59 through the said valve. In the chamber 60 is provided another valve 81 which is identical with the valve 80 and which is supported on the wall structure 50. This valve serves as an outlet valve. The wall structure 50 has another port 82 in it which is adapted to bring the chamber 78 into communication with the chamber 60 through valve 81. Similar valves are used in conjunction with the chamber 79 and the piston unit 64 and operate in the same manner as the valves associated with unit 63.

Since all of the valves of the invention are identical, only the valve 80 which has been shown in detail in Fig. 3 will be described. This valve consists of two discs of rubber 118 and 119 which are frusto-conical or dish-shaped in form. These discs are supported on formed backing members 120 and 121 which smoothly fit the interior of said discs. These backing members are mounted on a sleeve 122 which registers with the port 109. The said sleeve has openings 123 in the same which brings the port 109 into communication with the space between the backing members 120 and 121. These backing members are further spaced from one another to form a slit 124 therebetween and through which the liquid may pass from the port 109 and into the compartment 78. The marginal portions of the discs 118 and 119 normally engage each other to prevent the flow of liquid into the valve but readily yield when the pressure is brought into the valve through the openings 123 and slit 124 to direct the liquid pumped into the compartment 78. A retainer 125 engages the lowermost disc 119 at the lower part of the same while a crowfoot 126 is seated in an annular groove 127 in the wall structure 59 concentric with the port 112. A bolt 128 passes through the crowfoot 126 and the retainer 125 and clamps the parts in position and holds the valve attached to the raised portion 76 of the wall structure 50. In addition this bolt clamps the innermost portions of the discs 118 and 119 against the backing members 120 and 121.

The crank shaft 33 has a protruding end 83 on which is mounted and secured a flywheel 84. This flywheel has a groove 85 in the same. A V-belt 86 is received in said groove and passes about said flywheel and pulley 24 of motor 12. By means of this construction the crank shaft 33 is driven. The motor 12 is so connected that the crank shaft 33 travels in a clockwise direction as indicated by the arrow in Fig. 1.

On the lower end of the connecting rod 69 are formed two spaced lugs 95. These lugs are drilled to receive a transversely extending pin 96. On this pin is mounted a grooved sleeve 97. One end 98 of a tension coil spring 99 is hooked over the sleeve 97 and is disposed between the two lugs 95. The other end 100 of the spring is hooked over another grooved sleeve 101 which is mounted on a pin 102. Pin 102 is supported by two spaced lugs 103 similar to the lugs 95. These lugs are formed on a swinging arm 104 which is pivoted on a shaft 105 extending across and journaled in two lugs 106 formed on a bracket 107. Bracket 107 is attached to the platform 113 of base 11 by means of cap screws 108 and supports the arm 104 for swinging movement in the direction of movement of the connecting rod 69. The axis of the pin 102 is disposed to the right of a plane perpendicular to diphragm 47 and passing through the axes of the shaft 33 and piston unit 63.

Adjustment of the arm 104 is procured through a screw 110 screwed into a threaded boss 111 on said arm. This screw engages a partition 112 extending across the walls 16 of the base portion 15. Spring 99 holds said screw in engagement with said partition and adjustment of the screw varies the tension on spring 99. A lock nut 113 on screw 110 holds said screw in adjusted position.

The method of operation of the invention is as follows: The crank shaft 33 travels in a clockwise direction as viewed in Fig. 1. Due to such rotation, friction between the connecting rod bearing 75 and the crank member or eccentric 34 tends to urge the entire connecting rod 69 and piston 65 to rotate in a clockwise direction. On the pressure stroke of piston 65 the force on the piston is downward and being uniformly distributed can be considered as concentrated at the center of the piston directly above the axis of crank shaft 33. But the support for the piston is the crank member or eccentric 34 which throughout the compression stroke is to the left of the axis of shaft 33. This produces a moment also tending to rotate the connecting rod in a clockwise direction. When the piston is on its return stroke the same is subject to suction and the force on the piston is upward. But in such case the crank member 34 is to the right. This produces a moment on the connecting rod also tending to rotate it in a clockwise direction. Thus all the forces acting on the connecting rod tend to rotate it in a clockwise direction. By arranging the spring anchor formed by pin 102 for the spring to the right as shown in Fig. 1 the axis of spring 99 does not pass through the axis of shaft 33 but to the left of it. This in turn creates a moment acting on connecting rod 69 which tends to rotate said connecting rod in a counter clockwise direction. Thus the spring tends to counteract the effect of the friction and pumping forces and reduces lateral strain on the diaphragm as well as making the pump run smoother. Throughout the entire cycle spring 99 is pulling down on the connecting rod. During the compression stroke the force created by compression of the fluid pumped causes the upper part of bearing 75 to bear on the eccentric 34. The spring 99 also urges the upper part of said bearing to bear on the eccentric 34. On the return stroke spring 99 still maintains the upper surface of the bearing against the eccentric. On the pressure stroke the force to be overcome is the greatest. However, the counteracting force is also greater due to the fact that the lever arm of the spring 99 is the greater, the axis of the eccentric 31 being to the left as viewed in Fig. 1 and a greater distance from the vertical plane through the axis of the pin 102. Thus the counteracting pressure is substantially proportional to the pressure to be resisted and there is no knocking or pounding and wear due thereto is greatly reduced.

The advantages of the invention are manifest. By means of the construction employed a simple sleeve bearing can be utilized between the crank shaft and connecting rod. Slack or play is at all times taken up in this bearing so that pounding or knocking is prevented. By the disposition of the spring as brought out the tendency to rotate the piston and connecting rod in the operation of the pump is partially counter balanced so that less strain on the diaphragm is produced and a smoother running pump results. The tension on the spring can be adjusted to cause the invention to operate at maximum efficiency. The invention is easily adapted to diaphragm pumps and once installed operates without attention.

Changes in the specific form of the invention, as herein described, may be made within the scope of what is claimed without departing from the spirit of the invention.

Having described the invention, what is claimed as new and desired to be protected by Letters Patent is:

1. In combination, a supporting structure, a reciprocable member mounted for reciprocation therein, a connecting rod, connecting means connecting said member to said connecting rod and causing said member and connecting rod to travel in unison, a connecting rod bearing in the outer end of said connecting rod, a crank shaft bearing in said supporting structure, crank means including a crank shaft journalled for rotation in said crank shaft bearing, said crank means having a crank member eccentric with the axis of said crank shaft and journalled in said connecting rod bearing, said connecting rod bearing having a thrust portion by means of which the thrust created by the crank member is transmitted to the connecting rod, said crank member when moving on one side of the axis of the crank shaft engaging said thrust portion of the connecting rod bearing and giving to the reciprocable member an advancing stroke and when moving on the other side of said axis giving to said member a return stroke, and a spring connected to said connecting rod at the locality of the bearing therein and to said supporting structure at a locality to urge the thrust portion of the connecting rod bearing into engagement with the crank member on the return stroke to maintain said portion of said bearing in engagement with the crank member throughout the movement of the crank member to eliminate pounding between the connecting rod bearing and crank member upon reversal of the stroke of said reciprocable member.

2. In combination, a supporting structure, a reciprocable member mounted for reciprocation therein, a connecting rod, connecting means connecting said member to said connecting rod and causing said member and connecting rod to travel in unison, a connecting rod bearing in the outer end of said connecting rod, a crank shaft bearing in said supporting structure, crank means including a crank shaft journalled for rotation in said crank shaft bearing, said crank means having a crank member eccentric with the axis of said crank shaft and journalled in said connecting rod bearing, said connecting rod bearing having a thrust portion by means of which the thrust created by the crank member is transmitted to the connecting rod, said crank member when moving on one side of the axis of the crank shaft engaging said thrust portion of the connecting rod bearing and giving to the reciprocable member an advancing stroke and when moving on the other side of said axis giving to said member a return stroke, and a spring acting between said connecting rod and said supporting structure at localities tending to urge the thrust portion of the connecting rod into engagement with the crank member on the return stroke to maintain said portion of said bearing in engagement with the crank member throughout the movement of the crank member to eliminate pounding between the connecting rod bearing and crank member upon reversal of the stroke of said reciprocable member.

3. In combination, a supporting structure, a reciprocable member mounted for reciprocation therein, a connecting rod, connecting means connecting said member to said connecting rod and causing said member and connecting rod to travel in unison, a connecting rod bearing in the outer end of said connecting rod, a crank shaft bearing in said supporting structure, crank means including a crank shaft journalled for rotation in said crank shaft bearing, said crank means having a crank member eccentric with the axis of said crank shaft and journalled in said connecting rod bearing, said connecting rod bearing having a thrust portion by means of which the thrust created by the crank member is transmitted to the connecting rod, said crank member when moving on one side of the axis of the crank shaft engaging said thrust portion of the connecting rod bearing and giving to the reciprocable member an advancing stroke and when moving on the other side of said axis giving to said member a return stroke, said connecting rod having an extension extending beyond said bearing, and a tension coil spring connected to said extension and to said supporting structure at a locality beyond said connecting rod and maintaining the portion of the connecting rod bearing opposite said extension in engagement with said crank member throughout the return stroke of said reciprocable member.

4. In combination, a supporting structure, a reciprocable member mounted for reciprocation therein, a connecting rod, connecting means connecting said member to said connecting rod and causing said member and connecting rod to travel in unison, a connecting rod bearing in the outer end of said connecting rod, a crank shaft bearing in said supporting structure, crank means including a crank shaft journalled for rotation in said crank shaft bearing, said crank means having a crank member eccentric with the axis of said crank shaft and journalled in said connecting rod bearing, said connecting rod bearing having a thrust portion by means of which the thrust created by the crank member is transmitted to the connecting rod, said crank member when moving on one side of the axis of the crank shaft engaging said thrust portion of the connecting rod bearing and giving to the reciprocable member an advancing stroke and when moving on the other side of said axis giving to said member a return stroke, the friction between said crank member and the connecting rod bearing producing a moment tending to rotate said connecting rod in the same direction as the direction of rotation of said crank shaft and a coil spring engaging said connecting rod at the locality of the bearing therein and said supporting structure at a locality to one side of a plane passing through the axis of said crank member and the axis of said reciprocable member and such that said spring produces a moment opposite to the aforementioned moment and tending to rotate said connecting rod in the opposite direction.

5. In combination, a supporting structure, a reciprocable member mounted for reciprocation therein, a connecting rod, connecting means connecting said member to said connecting rod and causing said member and connecting rod to travel in unison, a connecting rod bearing in the outer end of said connecting rod, a crank shaft bearing in said supporting structure, crank means including a crank shaft journalled for rotation in said crank shaft bearing, said crank means having a crank member eccentric with the axis of said crank shaft and journalled in said connecting rod bearing, said connecting rod bearing having a thrust portion by means of which the thrust created by the crank member is transmitted to the connecting rod, said crank member when moving on one side of the axis of the crank shaft engaging said thrust portion of the connecting rod bearing and giving to the reciprocable member an advancing stroke and when moving on the other side of said axis giving to said member a return stroke, said connecting rod having an extension extending beyond said bearing and a spring connected to said extension and to said supporting structure and maintaining the thrust portion of the bearing in engagement with said crank member throughout the return stroke of the reciprocable member and a spring anchor for said spring mounted on said supporting structure and disposed on the same side of the axis of said crank shaft as the crank member when the reciprocable member is on its return stroke.

6. In combination, a supporting structure, a reciprocable member mounted for reciprocation therein, a connecting rod, connecting means connecting said member to said connecting rod and causing said member and connecting rod to travel in unison, a connecting rod bearing in the outer end of said connecting rod, a crank shaft bearing in said supporting structure, crank means including a crank shaft journalled for rotation in said crank shaft bearing, said crank means having a crank member eccentric with the axis of said crank shaft and journalled in said connecting rod bearing, said connecting rod bearing having a thrust portion by means of which the thrust created by the crank member is transmitted to the connecting rod, said crank member when moving on one side of the axis of the crank shaft engaging said thrust portion of the connecting rod bearing and giving to the reciprocable member an advancing stroke and when moving on the other side of said axis giving to said member a return stroke, the friction between said crank member and the connecting rod bearing producing a moment tending to rotate said connecting rod in the same direction as the direction of rotation of said crank shaft and a coil spring engaging said connecting rod and said supporting structure at localities such that said spring produces a moment opposite to the aforementioned moment and tending to rotate said connecting rod in the other direction.

References Cited in the file of this patent

UNITED STATES PATENTS

| 2,287,627 | Malsbary | June 23, 1942 |
| 2,550,392 | Venning | Apr. 24, 1951 |